United States Patent
Lin

(10) Patent No.: US 11,739,778 B2
(45) Date of Patent: Aug. 29, 2023

(54) TELESCOPIC TUBE HAVING A STABILIZING STRUCTURE

(71) Applicant: Chien-Ting Lin, Santa Fe Springs, CA (US)

(72) Inventor: Chien-Ting Lin, Santa Fe Springs, CA (US)

(*) Notice: Subject to any disclaimer, the term of this patent is extended or adjusted under 35 U.S.C. 154(b) by 0 days.

(21) Appl. No.: 16/856,383

(22) Filed: Apr. 23, 2020

(65) Prior Publication Data

US 2020/0340512 A1  Oct. 29, 2020

(30) Foreign Application Priority Data

Apr. 25, 2019 (CN) .......................... 201920577861.4

(51) Int. Cl.
*F16B 7/14* (2006.01)

(52) U.S. Cl.
CPC ................. *F16B 7/1418* (2013.01)

(58) Field of Classification Search
CPC ........ F16B 7/14; F16B 7/1418; F16B 7/1454; Y10T 403/32467
See application file for complete search history.

(56) References Cited

U.S. PATENT DOCUMENTS

| | | | | |
|---|---|---|---|---|
| 5,349,780 A * | 9/1994 | Dyke | ..................... | A01G 9/122 24/458 |
| 6,142,699 A * | 11/2000 | Pao | ....................... | F16B 7/1454 403/109.5 |
| 6,454,483 B1 * | 9/2002 | Hoshino | .............. | F16B 7/0413 248/188.5 |
| 6,830,227 B2 * | 12/2004 | Nakatani | .................. | F16B 7/10 248/354.3 |
| 6,843,183 B2 * | 1/2005 | Strong | ..................... | A47B 9/14 108/147.19 |
| 8,419,564 B1 * | 4/2013 | Solheim | ................. | A63B 53/08 473/296 |
| 9,144,301 B2 * | 9/2015 | Riis | ........................... | F16B 7/14 |
| 9,403,267 B2 * | 8/2016 | Ho | ......................... | F16B 7/105 |

* cited by examiner

*Primary Examiner* — Michael P Ferguson
(74) *Attorney, Agent, or Firm* — LIN & ASSOCIATES INTELLECTUAL PROPERTY, INC.

(57) ABSTRACT

Provided is a telescopic tube having a stabilizing structure, including: a first tube having an internal and external end, wherein at least three longitudinal stabilizing lines are protruded from an outer wall of the internal end, and at least one stabilizing line has a blocking surface disposed at one end thereof near the external end; and a second tube having an inner diameter larger than an outer diameter of the first tube and a diameter of an outer periphery of the stabilizing lines, and having an upper and lower end, wherein the upper end is provided with a blocking portion having an opening. The second tube is sleeved outside the first tube, the external end penetrates through the opening to expose outside the second tube, and the internal end remains therein. Therefore, the first tube can be stably slidable inside the second tube due to the stabilizing lines.

3 Claims, 14 Drawing Sheets

TELESCOPIC TUBE HAVING A STABILIZING STRUCTURE

CROSS-REFERENCE TO RELATED APPLICATION

This application claims the priority of Chinese patent application No. 201920577861.4, filed on Apr. 25, 2019, which is incorporated herewith by reference.

BACKGROUND OF THE INVENTION

1. Field of the Invention

The present invention relates to a telescopic tube, and more particularly, to a telescopic tube having a stabilizing structure.

2. The Prior Arts

A conventional telescopic tube includes an inner tube and an outer tube. The inner tube can slide inside the outer tube. One end of the inner tube is adhered with a rubber, or provided with a lateral ring-shaped protrusion or a lateral arc-shaped protrusion. The main objective thereof is to increase the stability of the movement between the inner tube and the outer tube, in order to avoid the separation of the inner tube from the outer tube when both are being pulled relative to each other.

Generally, the conventional telescopic tube having the above-mentioned stabilizing structure can achieve the stability of the movement between the inner tube and the outer tube and thus avoid the problem of separation from each other. Some telescopic tubes only use a single stabilizing structure, while others use two stabilizing structures at the same time to enhance the stability. However, no matter what kind of the existing stabilizing structures, in order to increase the stability, it is necessary to increase the thickness of the rubber and the height of the protrusion, thereby reducing the gap between the inner tube and the outer tube to achieve a stabilizing function. This approach can increase the stability of the movement between the inner tube and the outer tube. However, the outer tube and the inner tube may have the manufacturing tolerances in size and shape and thus the stabilizing structure of the inner tube may have too many contacts with the outer tube at the same cross-sectional plane of the tubes, thereby causing the relative movement between the inner tube and the outer tube to be non-smooth, even causing a problem that the tubes are getting stuck.

SUMMARY OF THE INVENTION

In order to overcome the problem that the tubes are getting stuck due to the increase in the stability, the present invention provides a telescopic tube having a stabilizing structure. In the case without changing the inner diameter of the first tube, at least three longitudinal stabilizing lines are protruded from an outer wall of the internal end of the first tube. The stabilizing lines can reduce the gap between the first tube and the second tube to increase the stability. Also, at least one of the stabilizing lines is disposed with a blocking surface, which can enhance the abutting of the blocking surface against the blocking portion of the second tube, so as to avoid the separation of the first tube from the second tube.

The technical solution of solving the technical problems used by the present invention is to provide a telescopic tube having a stabilizing structure, comprising a first tube and a second tube. The first tube has an internal end and an external end, and the first tube has a constant inner diameter, wherein at least three longitudinal stabilizing lines are protruded from an outer wall of the internal end, an inner wall of the internal end is formed with recesses corresponding to the at least three longitudinal stabilizing lines, respectively, and an outer periphery of the stabilizing lines is defined along an outer edge of each of the stabilizing lines in a cross-sectional plane of the first tube, and wherein at least one of the stabilizing lines has a blocking surface disposed at one end thereof near the external end, and an angle formed by the blocking surface and the first tube is approximately a right angle. The second tube has an inner diameter larger than an outer diameter of the first tube and a diameter of the outer periphery of the stabilizing lines, and has an upper end and a lower end, wherein the upper end is provided with a blocking portion having an opening, and the opening has an inner diameter larger than the outer diameter of the first tube and smaller than the diameter of the outer periphery of the stabilizing lines; and wherein the second tube is sleeved outside the first tube, the first tube is slidable inside the second tube, and the external end penetrates outward through the opening; the external end and the lower end are pulled in opposite directions such that a length of the external end exposing outside the second tube is increased until the blocking surface of the at least one stabilizing line abuts against the blocking portion, thereby the external end fully exposes outside the second tube, while the internal end remains inside the second tube; and a gap between the first tube and the second tube is reduced due to the stabilizing lines such that the first tube is stably slidable inside the second tube.

Preferably, the stabilizing lines are parallel to each other and parallel to the first tube.

Preferably, the blocking portion is a sleeve provided with a fastening member. When the fastening member is locked, the first tube is not slidable relative to the second tube. When the fastening member is released, the first tube is slidable relative to the second tube.

Preferably, each of the stabilizing lines is composed of a plurality of protruding points.

Preferably, each of the stabilizing lines is composed of a plurality of protruding line segments.

The advantageous effect of the present invention is to design at least three longitudinal stabilizing lines such that the cross-sectional plane of the internal end has at least three protrusions, which can increase the stability during the sliding of the internal end inside the second tube and keep the relative movement therebetween smooth, thereby avoiding the problem that the tubes are getting stuck due to the out of roundness of the second tube or the welds of the inner wall of the second tube.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Hereinafter, the embodiments of the present invention will be described with reference to FIGS. 1 to 9. This illustration is not intended to limit the embodiments of the present invention, but belongs to one of the embodiments of the present invention.

Figure 1:
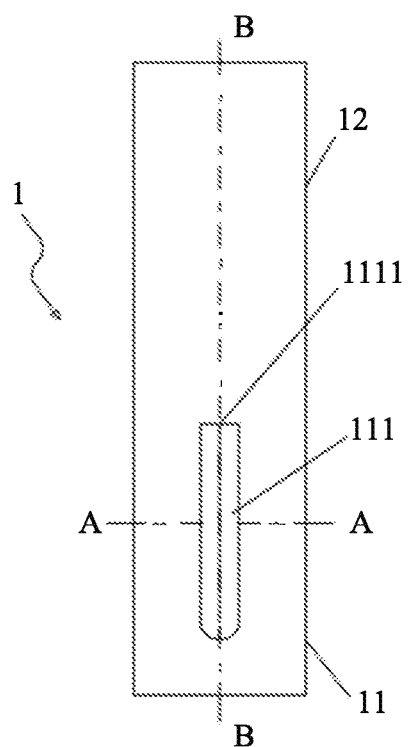
FIG. 1 is a schematic view of the first tube according to a first embodiment of the present invention.
Figure 2:
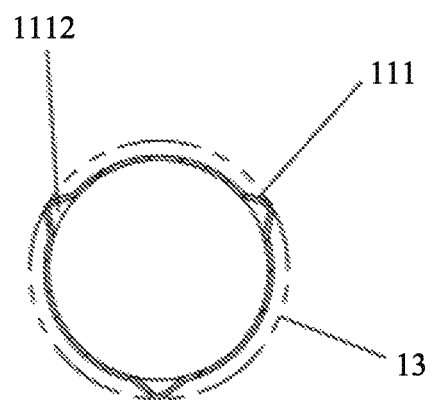
FIG. 2 is a cross-sectional schematic view taken along line A-A of FIG. 1 according to the first embodiment of the present invention.
Figure 3A:
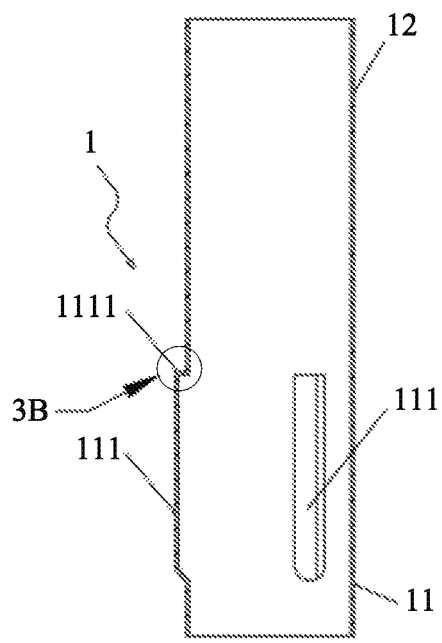
FIG. 3A is a cross-sectional schematic view taken along line B-B of FIG. 1 according to the first embodiment of the present invention.
Figure 3B:
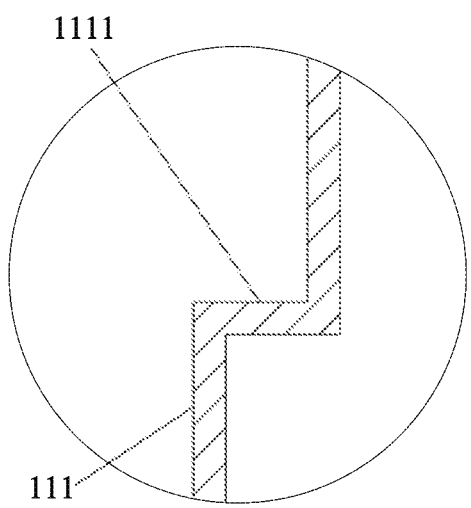
FIG. 3B is an enlarged view of a portion 3B of FIG. 3A according to the first embodiment of the present invention.
Figure 4:
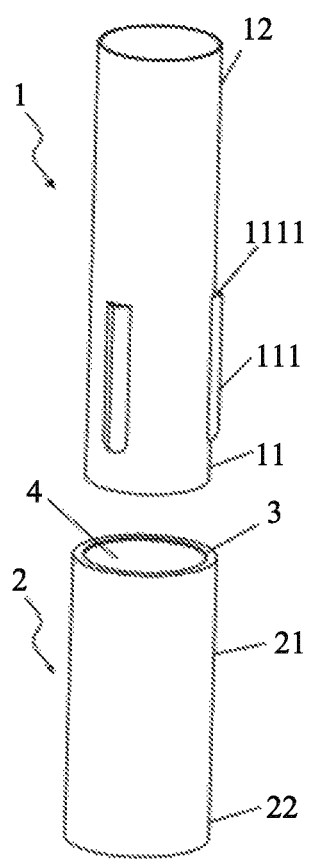
FIG. 4 is an exploded perspective schematic view according to the first embodiment of the present invention.
Figure 5:
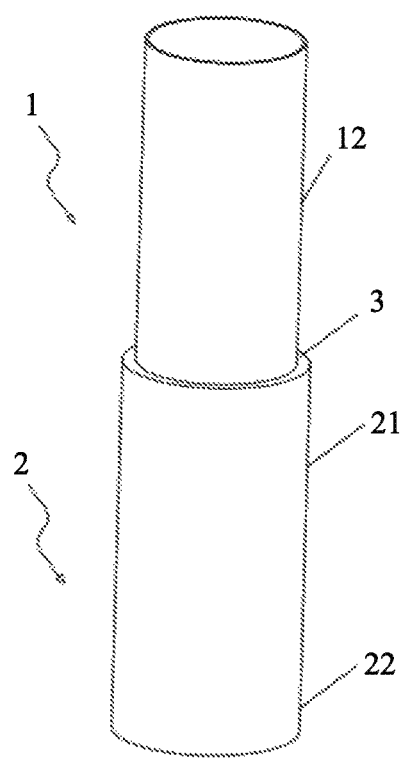
FIG. 5 is an assembled schematic view according to the first embodiment of the present invention.
Figure 6A:
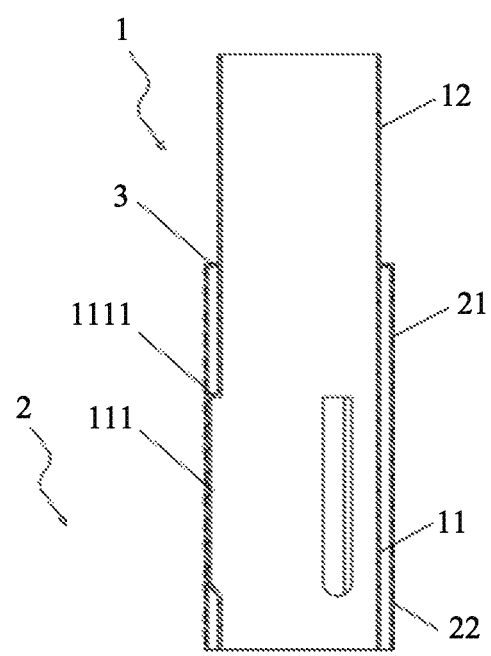
FIG. 6A is an assembled cross-sectional schematic view showing a state before pulling the external end and the lower end in opposite directions according to the first embodiment of the present invention.
Figure 6B:
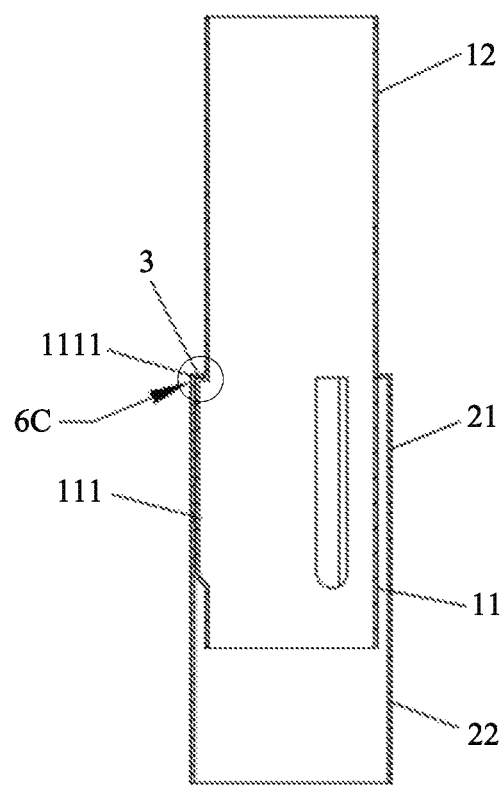
FIG. 6B is an assembled cross-sectional schematic view showing a state after pulling the external end and the lower end in opposite directions according to the first embodiment of the present invention.
Figure 6C:
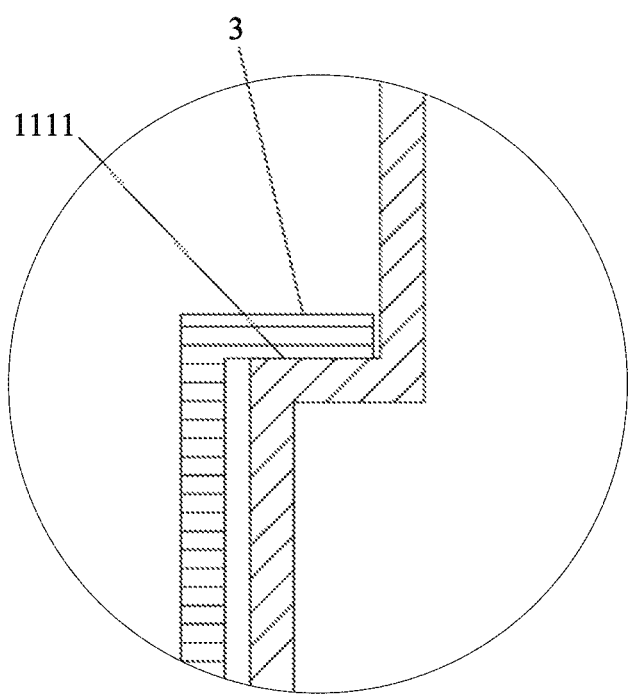
FIG. 6C is an enlarged view of a portion 6C of FIG. 6B according to the first embodiment of the present invention.

As shown in FIGS. 1 to 6C, a telescopic tube having a stabilizing structure according to the first embodiment of the present invention comprises a first tube 1 and a second tube 2. The first tube 1 has an internal end 11 and an external end 12, and the first tube 1 has a constant inner diameter. At least three longitudinal stabilizing lines 111 are protruded from an outer wall of the internal end 11. An inner wall of the internal end 11 is formed with recesses 1112 corresponding to the at least three longitudinal stabilizing lines 111, respectively. As shown in FIG. 2, an outer periphery of the stabilizing lines 111 is defined along an outer edge of each of the stabilizing lines 111 in a cross-sectional plane of the first tube. As shown in FIGS. 3A and 3B, at least one of the stabilizing lines 111 has a blocking surface 1111 disposed at one end thereof near the external end 12, and an angle formed by the blocking surface 1111 and the first tube 1 is approximately a right angle. As shown in FIGS. 4 to 6C, the second tube 2 has an inner diameter larger than an outer diameter of the first tube 1 and a diameter 13 of the outer periphery of the stabilizing lines 111. The second tube 2 has an upper end 21 and a lower end 22. The upper end 21 is provided with a blocking portion 3 having an opening 4. The opening 4 has an inner diameter larger than the outer diameter of the first tube 1 and smaller than the diameter 13 of the outer periphery of the stabilizing lines 111. As shown in FIG. 6A, the second tube 2 is sleeved outside the first tube 1. The first tube 1 can slide inside the second tube 2. The external end 12 penetrates outward through the opening 4. As shown in FIGS. 6B and 6C, the external end 12 and the lower end 22 are pulled in opposite directions such that a length of the external end 12 exposing outside the second tube 2 is increased until the blocking surface 1111 of the at least one stabilizing line 111 abuts against the blocking portion 3, thereby the external end 12 fully exposes outside the second tube 2, while the internal end 11 remains inside the second tube 2. A gap between the first tube 1 and the second tube 2 is reduced due to the stabilizing lines 111 such that the first tube 1 can stably slide inside the second tube 2.

Preferably, the stabilizing lines 111 are parallel to each other and parallel to the first tube 1, so as to increase the smoothness in the sliding between the first tube 1 and the second tube 2. Because the inner diameter of the second tube 2 is larger than the outer diameter of the first tube 1 and the diameter 13 of the outer periphery of the stabilizing lines 111, a gap is maintained between the first tube 1 and the second tube 2.

Figure 7A:
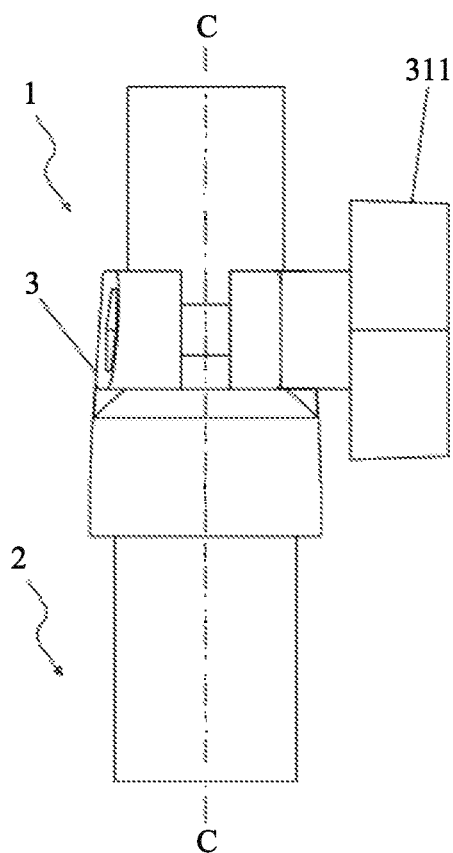
FIG. 7A is an assembled schematic view according to a second embodiment of the present invention.
Figure 7B:
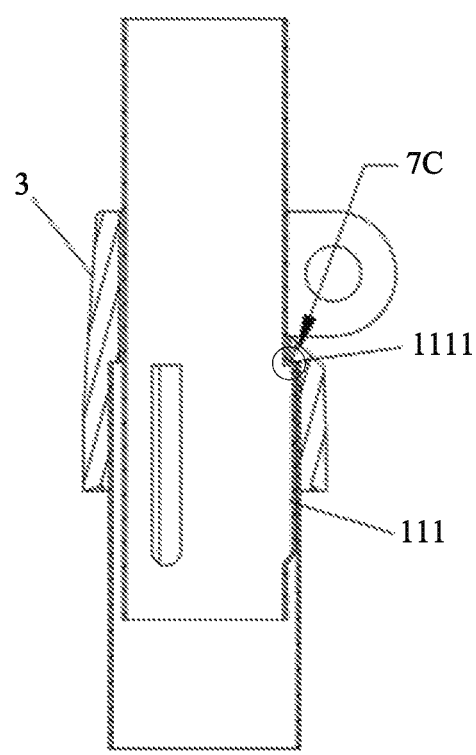
FIG. 7B is a cross-sectional schematic view taken along line C-C of FIG. 7A according to the second embodiment of the present invention.
Figure 7C:
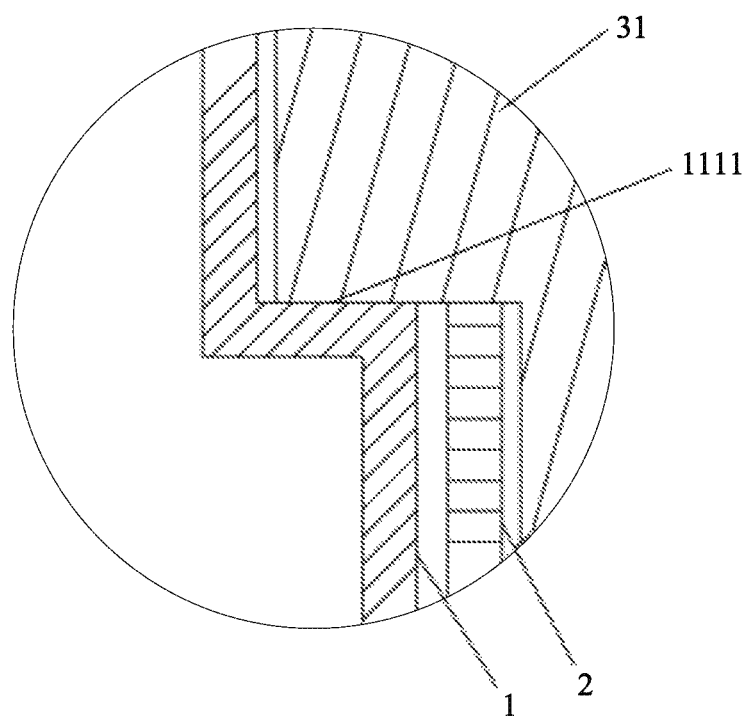
FIG. 7C is an enlarged view of a portion 7C of FIG. 7B according to the second embodiment of the present invention.

As shown in FIGS. 7A to 7C, according to the second embodiment of the present invention, the blocking portion 3 is a sleeve 31 provided with a fastening member 311. When the fastening member 311 is locked, the first tube 1 cannot slide relative to the second tube 2. When the fastening member 311 is released, the first tube 1 can slide relative to the second tube 2. The opening 4 of the sleeve 31 has an inner diameter larger than the outer diameter of the first tube 1 and smaller than the diameter 13 of the outer periphery of the stabilizing lines 111. The first tube 1 and the second tube 2 are pulled in opposite directions such that the blocking surface 1111 of the stabilizing line 111 abuts against the sleeve 31, thereby the external end 12 fully exposes outside the second tube 2, while the internal end 11 remains inside the second tube 2. A gap between the first tube 1 and the second tube 2 is reduced due to the stabilizing lines 111 such that the first tube 1 can stably slide inside the second tube 2.

The exploded perspective schematic view, assembled schematic view, and cross-sectional schematic view according to the third to fourth embodiments of the present invention are the same as the exploded perspective schematic view of FIG. 4, the assembled schematic view of FIG. 5, and the cross-sectional schematic views of FIGS. 6A to 6C according to the first embodiment. The difference of the stabilizing lines 111 between various embodiments is described below.

Figure 8:
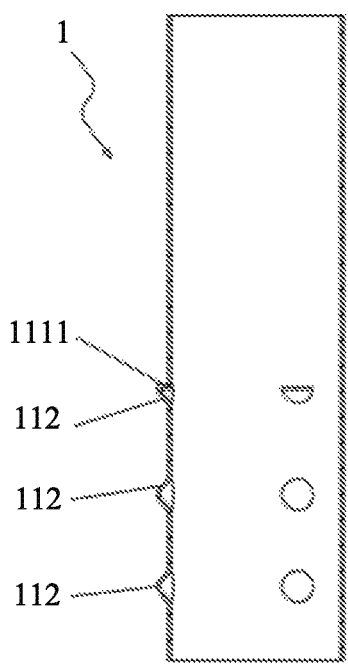
FIG. 8 is a schematic view of the first tube according to a third embodiment of the present invention.

Preferably, according to the third embodiment of the present invention as shown in FIG. 8, each of the stabilizing lines 111 is composed of a plurality of protruding points 112. This embodiment can reduce the requirement for the ductility of the material of the first tube 1, in order to prevent the first tube from being fractured caused by excess deformation.

Figure 9:
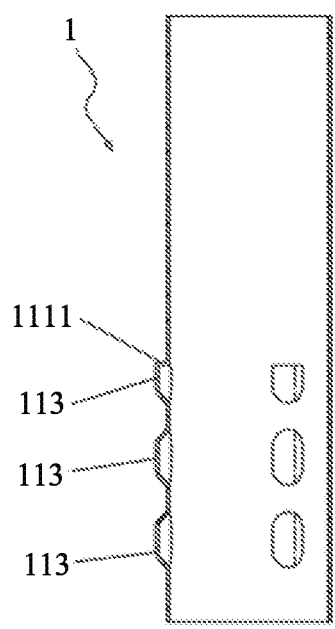
FIG. 9 is a schematic view of the first tube according to a fourth embodiment of the present invention.

Preferably, according to the fourth embodiment of the present invention as shown in FIG. 9, each of the stabilizing lines 111 is composed of a plurality of protruding line segments 113. This embodiment can also reduce the requirement for the ductility of the material of the first tube 1, in order to prevent the first tube from being fractured caused by excess deformation.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A telescopic tube having a stabilizing structure, comprising:
    a first tube having an internal end and an external end and having a constant inner diameter, wherein at least three longitudinal stabilizing lines are directly formed on the first tube and protruded from an outer wall surface of the internal end of the first tube, wherein the stabilizing lines are circumferentially-spaced about the outer wall surface and are parallel to each other and parallel to a longitudinal axis of the first tube, an inner wall surface of the internal end of the first tube is formed with recesses corresponding to the at least three longitudinal stabilizing lines, respectively, and an outer periphery of the stabilizing lines is defined along an outer edge of each of the stabilizing lines in a cross-sectional plane of the first tube, and wherein at least one of the stabilizing lines has a blocking surface disposed at an axial end thereof near and facing towards the external end of the first tube, and an angle formed by the blocking surface and the outer wall surface of the first tube is approximately a right angle;
    a second tube having an inner diameter larger than an outer diameter of the first tube and a diameter of the outer periphery of the stabilizing lines, and having an upper end and a lower end; and
    a clamping sleeve disposed on the upper end of the second tube, the clamping sleeve comprising an axially-extending through bore having a smaller diameter upper end portion, a larger diameter lower end portion which receives the upper end of the second tube, and a radially-extending annular shoulder disposed therebetween defining a blocking portion having an opening, and the opening has an inner diameter larger than the outer diameter of the outer wall surface of the first tube and smaller than the diameter of the outer periphery of the stabilizing lines such that the blocking portion abuts the blocking surface of the stabilizing lines when the stabilizing lines are moved towards the blocking portion of the clamping sleeve;
    wherein the second tube is sleeved outside the first tube, the first tube is slidable inside the second tube, and the external end of the first tube penetrates outward through the opening of the clamping sleeve;
    wherein the external end of the first tube and the lower end of the second tube are pulled in opposite directions such that a length of the external end of the first tube exposed outside the second tube is increased until the blocking surface of the at least one stabilizing line abuts against the blocking portion of the clamping sleeve, thereby the external end of the first tube is fully exposed outside the second tube, while the internal end of the first tube remains inside the second tube and the outer periphery of the stabilizing lines maintain a gap with an inner wall surface of the second tube;
    wherein a gap between the first tube and the second tube is reduced and maintained due to the stabilizing lines such that the first tube is stably slidable inside the second tube due to the gap between the outer periphery of the stabilizing lines and the inner wall surface of the second tube; and
    wherein an upper end of the clamping sleeve comprises a split sleeve portion with a fastening member for releasable clamping the split sleeve portion against the outer wall surface of the external end of the first tube to prevent the first tube from sliding relative to the second tube.

2. The telescopic tube according to claim 1, wherein each of the stabilizing lines is composed of a plurality of protruding points.

3. The telescopic tube according to claim 1, wherein each of the stabilizing lines is composed of a plurality of protruding line segments.

\* \* \* \* \*